United States Patent

Nehl et al.

[11] Patent Number: 5,279,413
[45] Date of Patent: Jan. 18, 1994

[54] CONTAINER FOR FLAT ARTICLES, ESPECIALLY COINS

[75] Inventors: Wolfgang Nehl, Tumlingen/Waldachtal; Karl-Hans Sackmann, Waldkirch, both of Fed. Rep. of Germany

[73] Assignee: fischerwerke Artur Fischer GmbH & Co. KG., Tumlingen/Waldachtal, Fed. Rep. of Germany

[21] Appl. No.: 946,466

[22] PCT Filed: Aug. 26, 1992

[86] PCT No.: PCT/EP92/01957
§ 371 Date: Nov. 12, 1992
§ 102(e) Date: Nov. 12, 1992

[87] PCT Pub. No.: WO93/04894
PCT Pub. Date: Mar. 18, 1993

[30] Foreign Application Priority Data

Sep. 4, 1991 [DE] Fed. Rep. of Germany ....... 4129392

[51] Int. Cl.[5] ................................................ A45C 1/10
[52] U.S. Cl. .................................. 206/0.82; 206/495; 220/348
[58] Field of Search ................. 206/0.8, 0.81, 0.82, 206/0.83, 0.84, 387, 37, 37.3, 39, 825, 477, 480, 495; 220/345, 348, 349

[56] References Cited

U.S. PATENT DOCUMENTS

| 1,655,390 | 1/1928 | Martine. | |
|---|---|---|---|
| 2,800,360 | 7/1957 | Jenkins. | |
| 2,892,537 | 6/1959 | Schwartz | 206/0.81 |
| 3,473,648 | 10/1969 | Paluzzi | 206/0.82 |
| 3,537,909 | 11/1970 | Horton | 206/0.84 |
| 3,837,475 | 9/1974 | Bolanz | 206/0.8 |

FOREIGN PATENT DOCUMENTS 3015748 10/1981 Fed. Rep. of Germany.
8806407 11/1988 Fed. Rep. of Germany.

Primary Examiner—Paul T. Sewell
Assistant Examiner—Jacob K. Ackun, Jr.
Attorney, Agent, or Firm—Michael J. Striker

[57] ABSTRACT

The container for flat articles, especially coins, which is part of a storage system for magnetic tape cassettes, in a motor vehicle, comprises a housing open on one side, a slider member insertable in the open side of the housing against a spring force and a locking device for locking the slider member in an inserted position. To provide a particularly reliable way of holding coins of different sizes so that they do not rattle when the container is moved, the slider member has a movable compartment floor which, as the slider member is pushed into the housing, is pressed by spring elements underlying it against an upper housing wall. The upper housing wall can be provided with foam strips and the compartment floor can be corrugated and provided with a fleece to better hold coins without rattling.

9 Claims, 1 Drawing Sheet

CONTAINER FOR FLAT ARTICLES, ESPECIALLY COINS

BACKGROUND OF THE INVENTION

The invention relates to a container for flat articles, especially coins, as part of a storage system for magnetic tape cassettes or the like for installation in a motor vehicle.

Containers that comprise, several housings open at a front side are known for, storing cassettes in vehicles. In each housing there is inserted a slider member on which the cassette is placed and pushed into the housing for storage. To remove the cassette, the slider member is unlocked by operation of a lock button. A pressure spring arranged between the rear wall of the slider member and the housing pushes the slider member together with the cassette out of the housing.

In addition to storing cassettes, it is often desirable to be able to store other articles in the vehicle as well, especially coins. Special coin holders have therefore already been proposed which can be fastened to the dashboard of the motor vehicle by adhesive strips. Moreover, it is known to integrate coin holders, for example, in the glove compartment.

The coin holders are generally designed so that they are suitable only for holding a specific size of coin. If smaller coins are placed in them, the noise they cause is irritating, which in turn often results in the integrated coin holders not being used. Finally, the coin holders are equally of no use for cross-border journeys on account of the different coin sizes.

SUMMARY OF THE INVENTION

It is an object of the present invention to provide a container for flat articles, especially coins, which can be installed in a vehicle in a simple and aesthetically pleasing manner as part of a storage system for magnetic tape cassettes to be mounted in a motor vehicle, and which enables coins of varying size to be stored without rattling.

This object and others which will be made more apparent hereinafter is attained in a container for flat articles, especially coins, which is part of a storage system for magnetic tape cassettes, in a motor vehicle, consisting of a housing open on one side, spring means for loading the slider member with a spring force, a slider member insertable in the open side of the housing against the spring force and means for locking the slider member in an inserted position.

According to the present invention, the container comprises a housing having an open side and an upper housing wall; a slider member having side walls and arranged to be insertable in the open side of the housing against a spring force; spring means to provide the spring force acting on the slider member; means for locking the slider member in the housing when the slider member is inserted in the housing; and a movable compartment floor and spring elements in the slider member. The spring elements and the compartment floor are located and structured so that the compartment floor is pressed by the spring elements upward toward and against the upper housing wall when the slider member is inserted in the housing so as to be able to hold a flat article between the compartment floor and the upper housing wall. The slider members provided with a movable compartment floor enable flat articles, especially coins, of any kind and of varying size to be inserted in the container. As the slider member is pushed into the housing, the compartment floor is pressed by spring elements against the upper walling of the housing, so that the inserted flat articles and coins are clamped in. The coins are therefore held captive and are unable to cause a noise during driving. The external contour of the housing is identical with the housing used for storing the magnetic tape cassettes. To equip a vehicle with a coin holder, all that is required is to exchange one cassette container of a storage device comprising several such containers for the coin holder. By integrating the coin holder in an overall system for storing articles in vehicles, both design requirements and safety requirements are fulfilled.

In preferred embodiments of the present invention the mobility of the compartment floor is assured, Since guide projections are provided, on its longitudinal sides which are guided in corresponding grooves in the side walls of the slider member. These grooves are bounded towards the upper edge of the side walls in order to prevent the compartment floor from escaping from the slider member.

A corrugated configuration of the surface of the compartment floor facilitates removal of the coins. An edging on the compartment floor provides a boundary when introducing the coins.

To improve the clamping action, in particular when the inserted coins are of different thicknesses, foam strips extending above the compartment floor can be arranged on the inner surface of the upper wall of the housing. To decrease the chance of the coins sliding around, in particular when the slider member is open, the compartment floor can also be covered with a fleece.

It is an advantage to use leaf springs stamped from metal as the spring elements. In order to press the compartment floor upwards in a parallel configuration, the rear end of the compartment floor is engaged by two spring elements arranged as a pair, and the front end is engaged by one spring element arranged in the center on the compartment floor. The spring elements acting on the rear end are fixed at one end to the housing and are bent trapezoidally so that a run-on slope directed towards the compartment floor is created. The spring element acting on the front end of the compartment floor is fixed at one end to the underside of the compartment floor while the other end presses against the lower walling of the housing when the slider member is inserted.

BRIEF DESCRIPTION OF THE DRAWING

The invention is explained in detail hereinafter with reference to the drawing, in which.

DETAILED DESCRIPTION OF THE PREFERRED EMBODIMENTS

Figure 1:
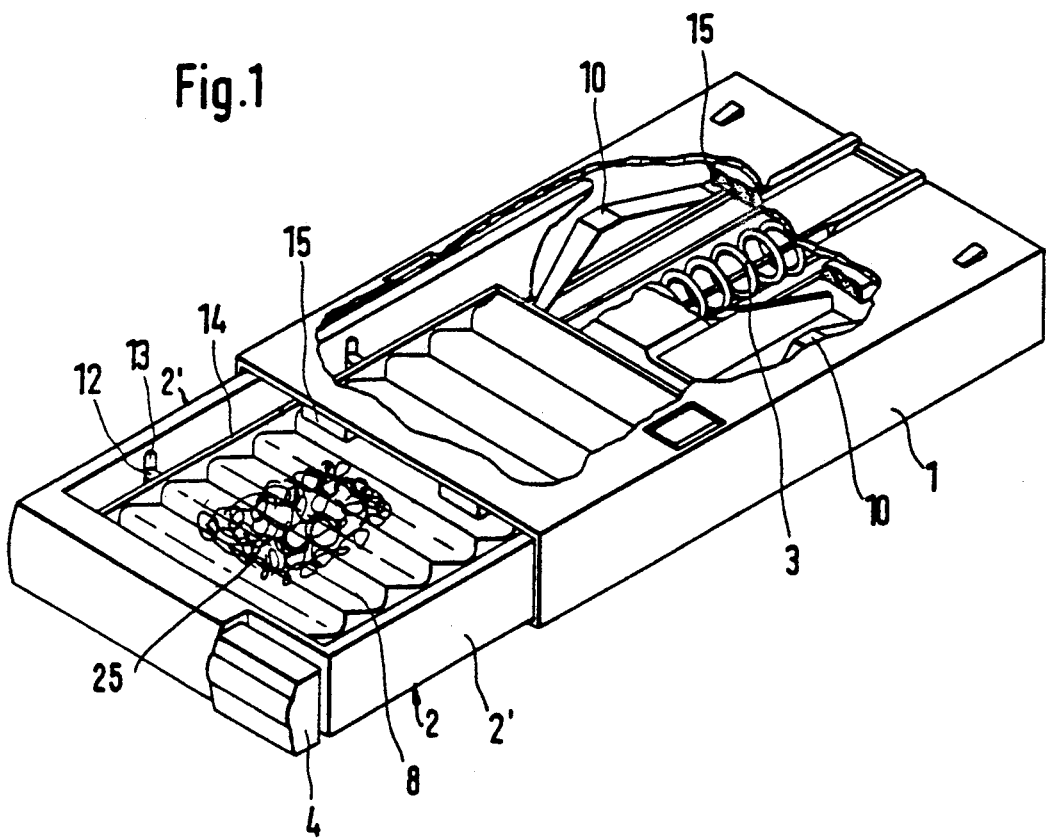
FIG. 1 is a partially cutaway perspective view of the container according to the invention.
Figure 2:
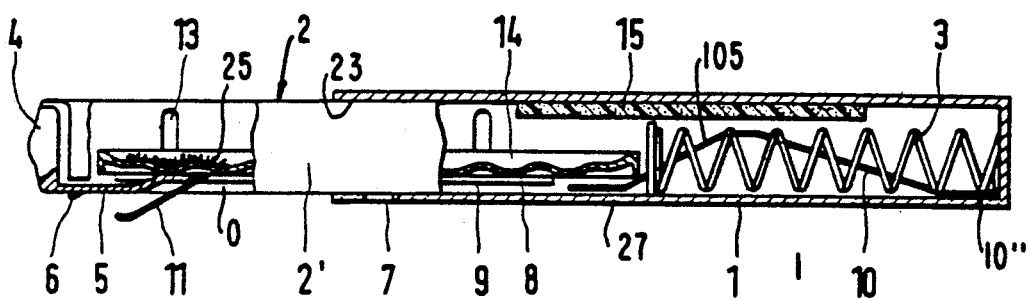
FIG. 2 is a partially cutaway side view, partially longitudinal cross-sectional view through the container shown in FIG. 1 in side.

The container consists of a housing 1 open on one side, into which a slider member 2 can be inserted against a spring 3. A button 4 which is integrally joined by way of a resilient tongue 5 with the slider member 2 is arranged at the front end of the slider member. On the underside of the tongue 5 there is a locking pin 6, which locks into an aperture 7 in the housing 1 as the slider member is closed. To open the slider member, the button 4 is pressed upwards slightly, so that the locking pin 6 is able to disengage the aperture 7 again.

To store flat articles, especially coins, a compartment floor 8 is provided in the frame-shaped slider member 2. In the ejected state the slider member 2 rests on supporting rails 9 arranged on the inner walling of the slider member. As the slider member is inserted into the housing, the compartment floor 8 is pressed by the spring elements 10, 11 towards the upper housing wall 23. As this happens, the compartment floor 8 is guided by guide projections 12 arranged laterally on its longitudinal sides, which projections engage in vertically arranged grooves 13 in the side walls 21 of the slider member 2.

In order to achieve a displacement of the compartment floor 8 that is as parallel as possible, a pair of spring elements 10 are provided, each of which is attached at one end 10'' to the rear of the housing 1 and engages at its other end with the compartment floor 8. Each of the spring elements 10 has a trapezoidal shape and has a sloping portion 10s pointing toward the compartment floor 8. The spring element 11 is fastened centrally to the front end of the compartment floor to press the front part of the compartment floor upwards. The spring element 11 stamped from spring sheet projects with its resilient end right through an opening O in the frame-shaped slider member 2. As the slider member 2 is inserted into the housing 1, this spring element bears against the bottom wall 27 of the housing and presses the front end of the compartment floor 8 upwards. To secure the compartment floor, the upward extent of the grooves 13 is limited.

The compartment floor 8 is provided to receive flat articles, especially coins. To facilitate removal of the coins, the floor surface of the compartment floor is of a corrugated configuration. Furthermore, the compartment floor 8 has an edging 14 which is somewhat less than the thickness of the flat articles or coins. To fix and clamp the coins so that they do not slide around, foam strips 15 which extend at least for the length of the compartment floor are mounted on the inside of the upper housing wall 23. To decrease the chance of coins sliding around, in particular when the slider member is open, the compartment floor can be provided with a thin fleece 25.

While the invention has been illustrated and embodied in a container for flat articles, especially coins, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Container for flat articles, comprising a housing having an open side and an upper housing wall; a slider member having side walls and arranged to be insertable in the open side of the housing against a counterwaiting spring force; spring means within said housing to provide the spring force acting on the slider member; means for locking the slider member in the housing when the slider member is fully inserted in the housing; said slider member further comprising a compartment floor and means for mounting the compartment floor so as to be upwardly and downwardly movable with respect to said side walls; at least one spring element within said housing, said at least one spring element operable to move said compartment floor upwardly as said slider member is inserted into said housing and to bias said compartment floor against the upper housing wall when the slider member is fully inserted in the housing so as to be able to hold flat articles between the compartment floor and the upper housing wall.

2. Container as defined in claim 1, wherein the compartment floor has longitudinal sides and guide projections extending from the longitudinal sides, and the side walls of the slider member are provided with a plurality of substantially vertical grooves in which said guide projections are guided.

3. Container as defined in claim 2, wherein each of the grooves in the side walls of the slider member is bounded at a groove end closest to the upper housing wall.

4. Container as defined in claim 1, wherein the compartment floor has a corrugated floor surface.

5. Container as defined in claim 2, wherein the compartment floor is provided with an edging along each of the longitudinal sides having a height less than a thickness of a flat article to be stored thereon.

6. Container as defined in claim 1, further comprising a plurality of foam strips on an inner surface of the upper housing wall above the compartment floor.

7. Container as defined in claim 6, wherein a pair of spring elements are provided each of said spring elements at one end thereof engaging a rear end of the compartment floor and fixed at another end thereof to the housing each of said spring elements having a trapezoidal shape with a sloping portion directed towards the compartment floor.

8. Container as defined in claim 7, wherein another spring element is fixed at one end thereof to an underside of the compartment floor and another end thereof passes through an opening in the inserted slider member and engages against a lower housing wall thereby urging the compartment floor upward when the slider member is inserted in the housing.

9. Container as defined in claim 1, wherein the compartment wall is provided with a fleece.

* * * * *